United States Patent
Fuegel

(10) Patent No.: US 8,282,130 B2
(45) Date of Patent: Oct. 9, 2012

(54) MOBILE WORK MACHINE

(75) Inventor: Dietmar Fuegel, Wolfschlugen (DE)

(73) Assignee: Putzmeister Engineering GmbH, Aichtal (DE)

( * ) Notice: Subject to any disclaimer, the term of this patent is extended or adjusted under 35 U.S.C. 154(b) by 232 days.

(21) Appl. No.: 12/735,015

(22) PCT Filed: Dec. 9, 2008

(86) PCT No.: PCT/EP2008/067055
§ 371 (c)(1),
(2), (4) Date: Jun. 9, 2010

(87) PCT Pub. No.: WO2009/097933
PCT Pub. Date: Aug. 13, 2009

(65) Prior Publication Data
US 2010/0264635 A1    Oct. 21, 2010

(30) Foreign Application Priority Data

Feb. 6, 2008 (DE) .......................... 10 2008 007 918

(51) Int. Cl.
*B62D 53/08* (2006.01)
(52) U.S. Cl. ................. 280/765.1; 280/763.1; 280/764.1
(58) Field of Classification Search .............. 280/763.1, 280/764.1, 765.1, 766.1; 212/301, 302, 303, 212/304, 305
See application file for complete search history.

(56) References Cited

U.S. PATENT DOCUMENTS

| 2,482,871 A | * | 9/1949 | Rapport ..................... 242/571.5 |
| 2,807,631 A | * | 9/1957 | Jenny ............................ 552/209 |
| 2,807,641 A | * | 9/1957 | Milner et al. ................... 562/98 |
| 2,807,651 A | * | 9/1957 | Britton et al. ................. 568/607 |
| 2,807,661 A | * | 9/1957 | Espenlaub et al. ............ 348/659 |
| 3,362,544 A | * | 1/1968 | Wellnitz ........................ 212/175 |
| 3,953,052 A | * | 4/1976 | Palmcrantz ................ 280/763.1 |
| 4,118,054 A | * | 10/1978 | Vigerie ...................... 280/765.1 |

(Continued)

FOREIGN PATENT DOCUMENTS

DE          10 91 304          10/1960

(Continued)

OTHER PUBLICATIONS

German Search Report dated Nov. 6, 2008 with English translation of relevant parts.

(Continued)

*Primary Examiner* — John Walters
*Assistant Examiner* — James Triggs
(74) *Attorney, Agent, or Firm* — Collard & Roe, P.C.

(57) ABSTRACT

Mobile work machine having a chassis that is designed as a tractor-trailer, a multi-axle tractor unit and a multi-axle semi-trailer that carries the work machine and is connected with the tractor unit by means of a fifth-wheel coupling, having a support construction that is disposed in the region of the semi-trailer and can be supported on a surface, raising the tractor-trailer, which construction has two front support booms disposed at bearing locations on the tractor unit end of the semi-trailer, symmetrical to the longitudinal chassis axis, which can be pivoted between a transport position and at least one support position, by means of a hydraulically driven activation mechanism, in each instance, and two rear support booms that can be pivoted between a transport position and at least one support position, whereby the semi-trailer has means for raising and holding the tractor unit in place.

21 Claims, 9 Drawing Sheets

U.S. PATENT DOCUMENTS

Figure 1:
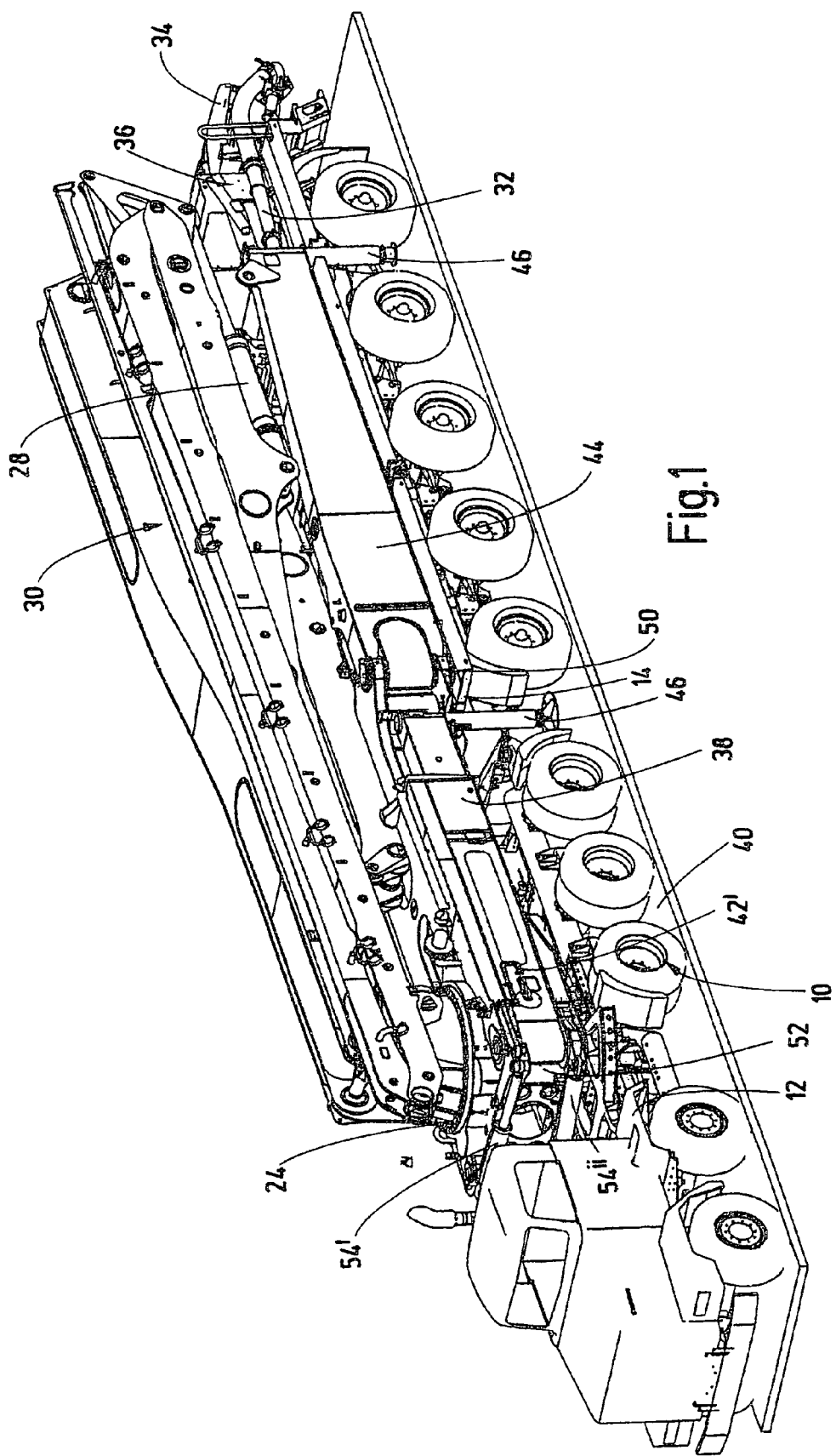

| | | | | |
|---|---|---|---|---|
| 4,418,713 A | * | 12/1983 | Schlecht | 137/351 |
| 4,607,862 A | * | 8/1986 | Deram et al. | 280/765.1 |
| 4,619,369 A | * | 10/1986 | Mertens | 212/304 |
| 4,624,357 A | * | 11/1986 | Oury et al. | 198/313 |
| 5,638,967 A | * | 6/1997 | Heckmann | 212/302 |
| 5,640,850 A | * | 6/1997 | Benckert et al. | 60/422 |
| 5,961,145 A | * | 10/1999 | Schillinger et al. | 280/764.1 |
| 6,092,975 A | * | 7/2000 | Cannon et al. | 414/563 |
| 6,138,645 A | * | 10/2000 | Joppig et al. | 123/556 |
| 6,276,718 B1 | * | 8/2001 | Wolfram et al. | 280/765.1 |
| 6,308,985 B1 | * | 10/2001 | Wolfram | 280/766.1 |
| 6,390,504 B1 | * | 5/2002 | Fetzer | 280/763.1 |
| 6,484,752 B1 | * | 11/2002 | Ebinger et al. | 137/615 |
| 6,516,917 B1 | * | 2/2003 | Mayer et al. | 182/17 |
| 6,773,033 B1 | * | 8/2004 | Fugel | 280/763.1 |
| 6,840,540 B2 | * | 1/2005 | Fugel | 280/763.1 |
| 7,478,834 B2 | | 1/2009 | Schlecht | |
| 7,654,800 B2 | * | 2/2010 | Leibbrand et al. | 417/234 |
| 8,087,695 B2 | * | 1/2012 | Fugel et al. | 280/766.1 |
| 2002/0109344 A1 | * | 8/2002 | Heckmann | 280/763.1 |
| 2009/0072525 A1 | * | 3/2009 | Banks | 280/763.1 |
| 2009/0102176 A1 | * | 4/2009 | Garceau | 280/763.1 |
| 2010/0264635 A1 | * | 10/2010 | Fuegel | 280/763.1 |

FOREIGN PATENT DOCUMENTS

| | | |
|---|---|---|
| DE | 43 30 137 | 3/1995 |
| DE | 197 36 109 | 2/1999 |
| DE | 198 40 151 | 3/1999 |
| DE | 100 32 622 | 1/2002 |
| EP | 0 038 954 | 11/1981 |
| EP | 0 786 431 | 7/1997 |
| GB | 2 087 816 | 6/1982 |
| GB | 2 128 144 | 4/1984 |
| WO | WO 2004/113646 | 12/2004 |

OTHER PUBLICATIONS

International Search Report.

* cited by examiner

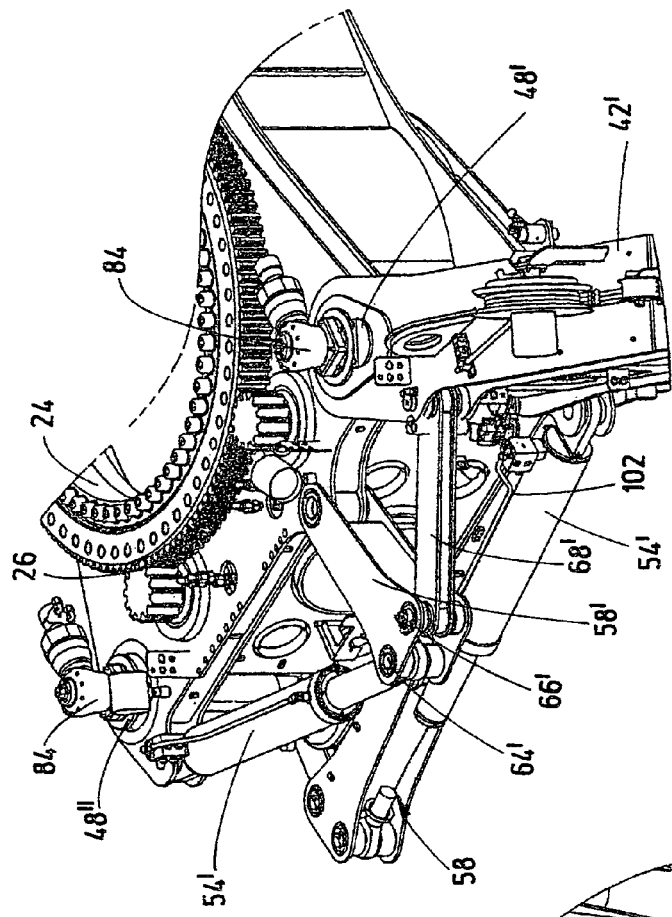
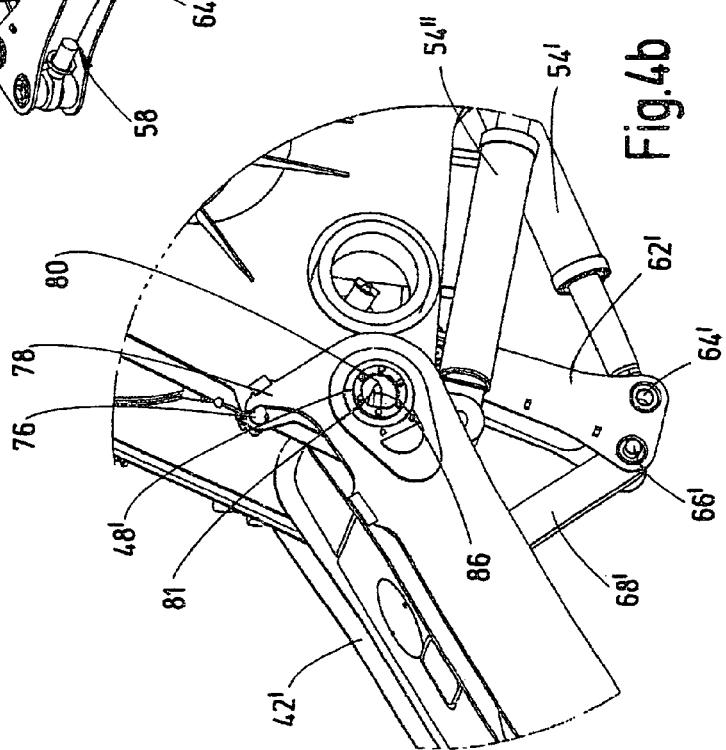
Fig.4a
Fig.4b

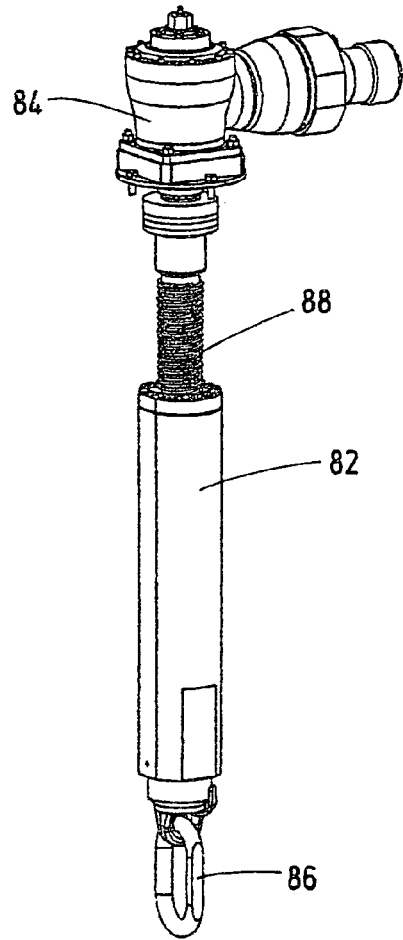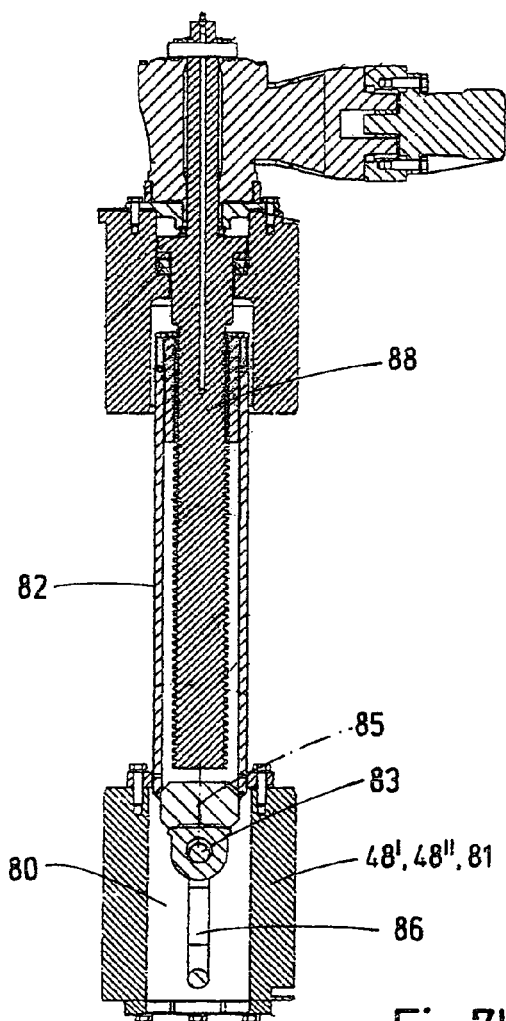
Fig.7a
Fig.7b

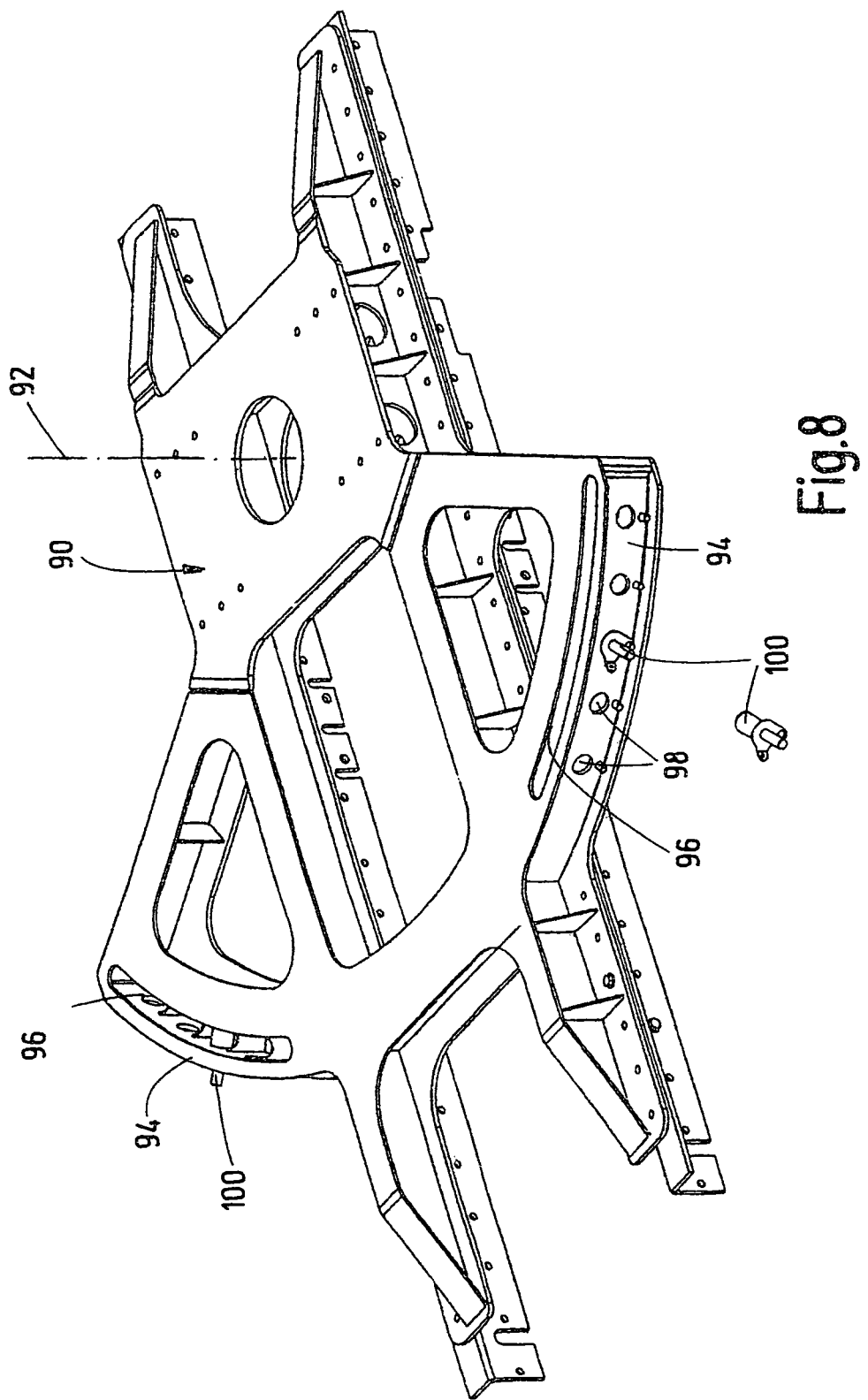

MOBILE WORK MACHINE

CROSS REFERENCE TO RELATED APPLICATIONS

This application is the National Stage of PCT/EP2008/067055 filed on Dec. 9, 2008, which claims priority under 35 U.S.C. §119 of German Application No. 10 2008 007 918.9 filed Feb. 6, 2008. The international application under PCT article 21(2) was not published in English.

The invention relates to a mobile work machine having a chassis that is designed as a tractor-trailer, a multi-axle tractor unit and a multi-axle semi-trailer that carries the work machine and is connected with the tractor unit by means of a fifth-wheel coupling, having a support construction that is disposed on the semi-trailer and can be supported on a surface, raising the tractor-trailer, which construction has two front support booms disposed at bearing locations on the tractor unit end of the semi-trailer, symmetrical to the longitudinal chassis axis, which can be pivoted between a transport position parallel to the longitudinal chassis axis, and at least one support position, by means of an activation mechanism, and two rear support booms that can be adjusted between a transport position and at least one support position, whereby the semi-trailer has means for raising and/or holding the tractor unit in place.

A mobile work machine of this type, configured as an automatic concrete pump, is known (EP 0 038 954 B1), in which the support booms of the support construction are disposed laterally on the semi-trailer and can pivot in such a manner that they can be pivoted out from a transport position into a support position, and can be telescoped, if necessary. A latch ensures that both a vertical and a horizontal transfer of force is possible by way of the fifth-wheel coupling, and that the tractor unit can nevertheless be pivoted about the vertical axis of a king pin, relative to the semi-trailer. A rotary bearing that is additionally provided on the fifth-wheel coupling allows a nodding movement of the tractor unit about a horizontal transverse axis, relative to the semi-trailer. In order to be able to use the tractor unit as a ballast weight in the raised position of the chassis, to stabilize the semi-trailer that is supported on the ground with the support booms, means for raising the tractor unit and holding it in the raised position are provided on the fixed part of the semi-trailer, which means have a lever there, which can be pivoted by means of a hydrocylinder, as well as a limp pulling organ that is disposed between the lever and the tractor unit.

The invention is based on the task of improving a mobile work machine having a chassis designed as a tractor-trailer, of the type indicated initially, to the effect that coupling or uncoupling of the tractor unit with or from the semi-trailer is facilitated, and that the clear space available for the semi-trailer can be optimally utilized for accommodating activation elements for the support construction.

In order to accomplish this task, the combination of characteristics indicated in claim 1 is proposed. Advantageous embodiments and further developments of the invention are evident from the dependent claims.

The solution according to the invention is based on the recognition that in the case of large tractor-trailers, in particular, a sufficiently large clear space is available between the face end of the semi-trailer and the driver's cab of the tractor-trailer, which space is sufficient for accommodating essential parts of the activation mechanism for the front support booms, so that the height of the semi-trailer and of its superstructure can be reduced. This is particularly advantageous if a large distributor mast, having a total length of 65 m and more, is supposed to be accommodated on the semi-trailer, in the case of mobile concrete pumps. In order to achieve this, it is proposed, according to the invention, that the activation mechanism of each front support boom has a cylinder/piston unit configured as a hydrocylinder, which extends beyond the face part of the semi-trailer, which unit is articulated, at its one end, directly with a bearing eye that is fixed in place on the semi-trailer, and, at its other end, indirectly with the related support boom, by way of a deflection gear mechanism.

A preferred embodiment of the invention provides that the cylinder/piston units assigned to the two front support booms are disposed one above the other, on the face of the semi-trailer, facing toward opposite sides. Since the cylinder/piston units can be pivoted about articulation axes that run parallel to the vertical axis, at their two ends, they engage at a slant into the clear space between the face of the semi-trailer and the driver's cab during the course of the extension procedure of the front support booms. It is advantageous if the bearing eyes of the cylinder/piston units assigned to the two front support booms, which eyes are fixed in place on the semi-trailer, are disposed on the side of the semi-trailer that faces the other front support boom, in each instance, preferably in the vicinity of the related bearing location.

A preferred embodiment of the invention provides that the deflection gear mechanism assigned to the activation mechanism of each support boom has a deflection lever that can be pivoted about an articulation axis parallel to the extension axis of the support boom, on an articulation that is fixed in place on the semi-trailer, with its one end, which lever has articulation locations at its other end, on which the cylinder/piston unit as well as the one end of a rigid extension rod are articulated, whereby the extension rod is articulated, with its other end, on an articulation location of the support boom disposed at a distance from the bearing location. It is practical if the articulation locations for the cylinder/piston unit and the extension rod that are situated on the deflection lever are disposed at a slight distance from one another. In order to be able to activate the activation mechanism so that it does not become constricted, all the bearing and articulation axes of the activation mechanism should be oriented parallel to the extension axis of the related support boom.

Because of the kinematics of the activation mechanism according to the invention, a constant feed of pressurized oil to the cylinder/piston unit would lead to a non-uniform angular velocity when the front support legs are pivoted out. In particular, at the beginning of each extension procedure, from the transport position of the support boom, a relatively large pivot path of the support boom would already occur at a small adjustment path of the cylinder/piston unit. In order to avoid this, it is proposed, according to a preferred embodiment of the invention, that the feed of pressurized oil to the cylinder/piston unit can be changed as a function of the angular position of the related front support boom or deflection lever. It is advantageous if this takes place automatically in that a throttle valve is disposed in a pressure agent feed line to the cylinder/piston unit, which valve can be controlled by way of a switching organ that responds in a defined angular position of the support boom or of the deflection lever.

In order to allow both normal support and narrow support of the support booms, the support booms have a releasable stop in a first support position that defines a normal position, and an end stop in a second support position.

According to a preferred embodiment of the invention, the work machine is configured as a concrete pump that has a pump unit disposed on the semi-trailer, having a material application container and a feed line that is connected with the pressure output of the pump unit, guided by way of a distributor mast.

It is practical if the work machine, configured as a concrete pump, and the support booms of the support construction, are disposed on at least one superstructure frame that is connected with the chassis that forms the semi-trailer. It is advantageous if an internal combustion engine that is independent of the drive of the tractor unit is disposed on the superstructure frame, for drive of the hydraulic units that belong to the concrete pump.

The invention is furthermore based on the idea that the tractor unit, which is connected with the semi-trailer by way of the fifth-wheel coupling, and can be pivoted relative to the semi-trailer about the vertical axis of the king pin, can be raised from the ground with simple means, together with the semi-trailer, during the stabilizing process, and can be utilized as a ballast weight. In order to allow this, it is proposed, according to a preferred embodiment of the invention, that the bearing locations of the support booms have a continuous, axis-central cavity, and that the means disposed on the semi-trailer for raising and holding the tractor unit in place each have a lifting element that passes through the central cavity of the bearing locations, from top to bottom, and can be fixed in place on the tractor unit. In this connection, it is practical if the cavity for the lifting element is disposed in a bearing pin that is fixed in place on the support boom.

A preferred embodiment of the invention provides that the lifting elements, which can be raised and lowered by means of a motor, in each instance, carry a coupling organ at their lower end, and that the tractor unit has an auxiliary frame on which the coupling organs of the lifting elements can be locked in place. In this connection, it is practical if the lifting elements are coupled with the related motor by way of a linear drive, in each instance, whereby the linear drive preferably has thread parts configured as a trapezoid thread.

Another preferred embodiment of the invention provides that the fifth-wheel coupling has a king pin disposed in the center, forming a vertical pivot axis between tractor unit and semi-trailer, and that the auxiliary frame is configured in the shape of an arc, in its outline, and disposed concentric to the king pin, and has multiple locking locations for the coupling organs of the lifting elements, disposed at a distance from one another in the circumference direction. With this measure, it is possible, in particularly simple manner, to raise the tractor unit from the ground at different angles oriented relative to the semi-trailer, during the course of the stabilizing process. It is advantageous if the coupling organs are fixed in place on the locking locations of the auxiliary frame by means of socket pins. For this purpose, the coupling organs are configured as oval rings that can be rotated and/or pivoted on the lifting element, which rings can be introduced into an arc-shaped motion-link guide of the auxiliary frame and can be fixed in place there, at the locking locations. In this connection, the locking locations form a hole grid in the auxiliary frame, which runs in the circumference direction, on the holes of which the oval rings can be fixed in place by means of socket pins. With the lifting elements coupled onto the auxiliary frame, the result is achieved that the wheels of the tractor unit can be raised from the ground during the stabilization process. In the travel state, the fifth-wheel coupling ensures that the tractor unit can perform a nodding movement relative to the semi-trailer, in order to be able to overcome unevenness of the road. For this purpose, the coupling organs of the lifting elements must be uncoupled from the auxiliary frame. In order to prevent damage in the travel state, the coupling organs can be retracted into the cavity of the related bearing locations, by means of a motor, by way of the lifting element, in each instance.

Figure 2A:
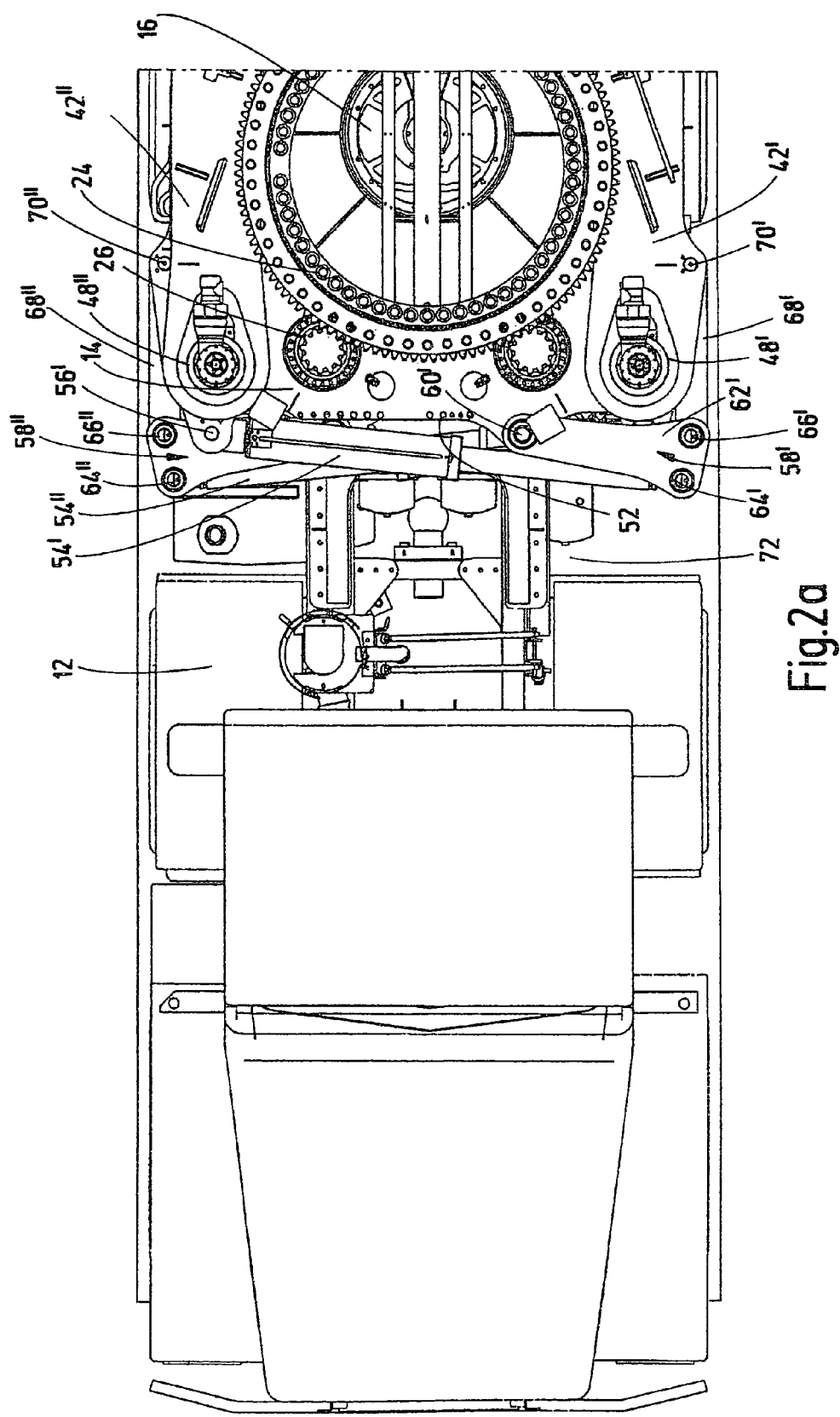
Figure 2B:
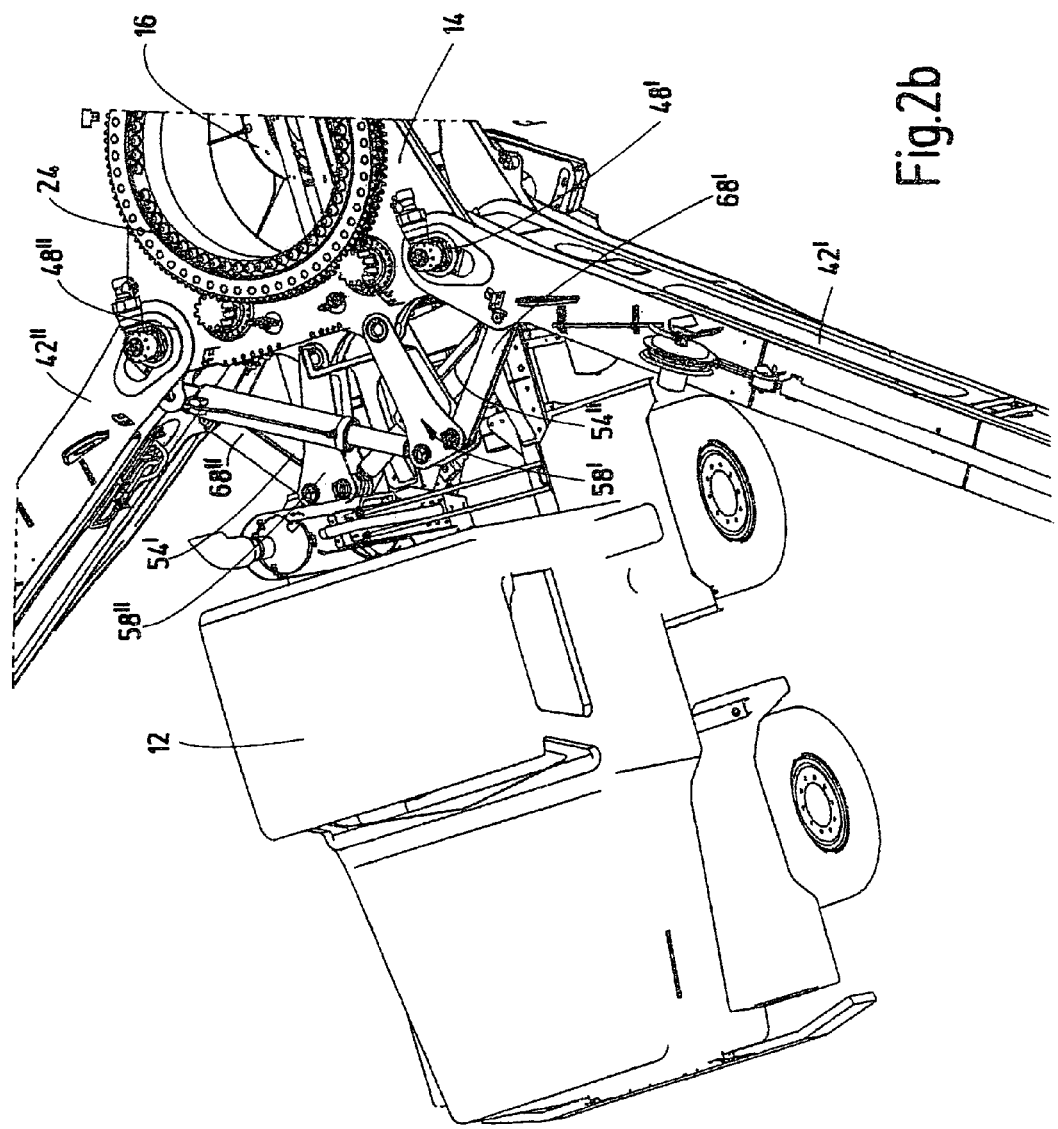
Figure 3A:
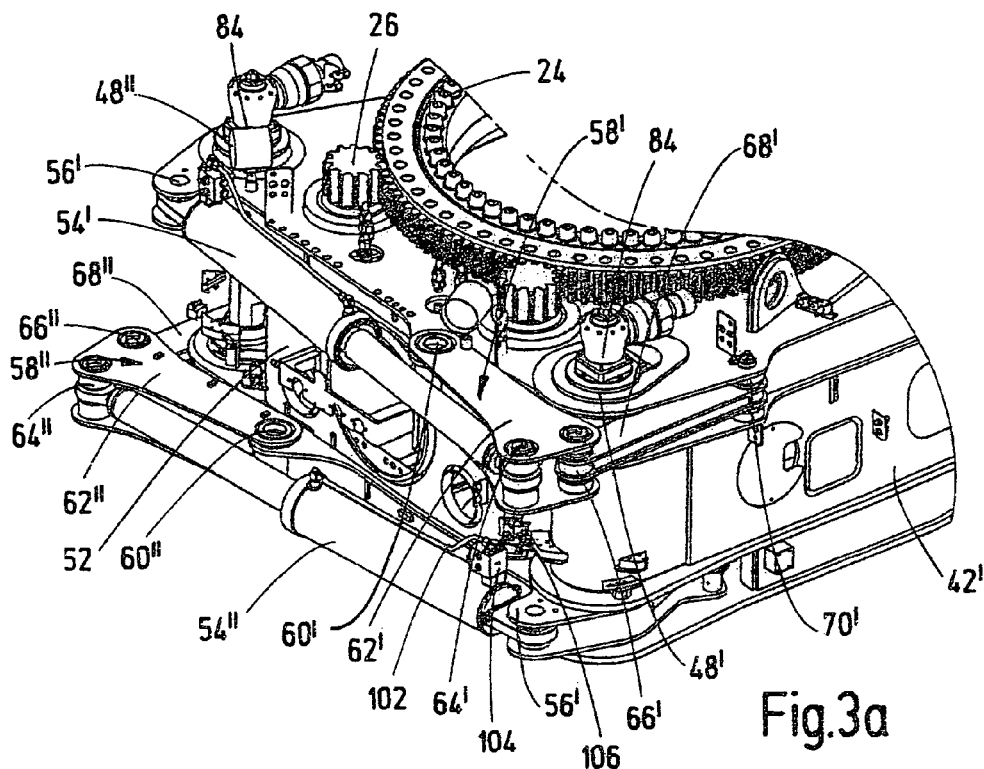
Figure 3B:
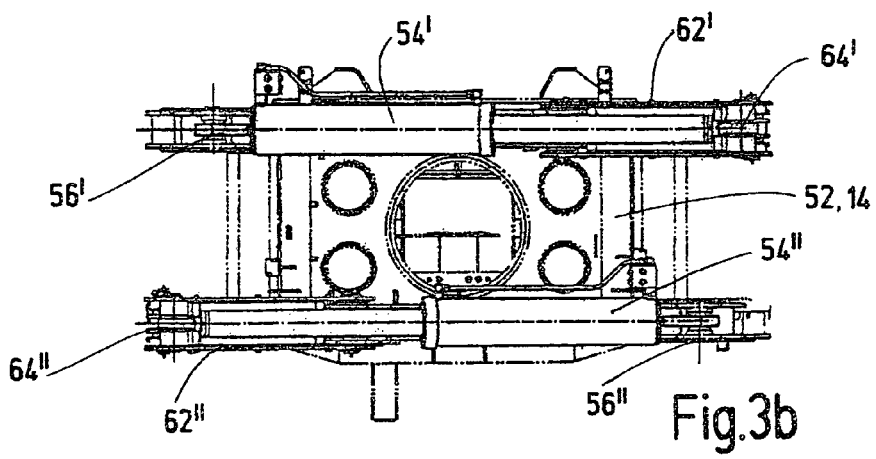
Figure 3C:
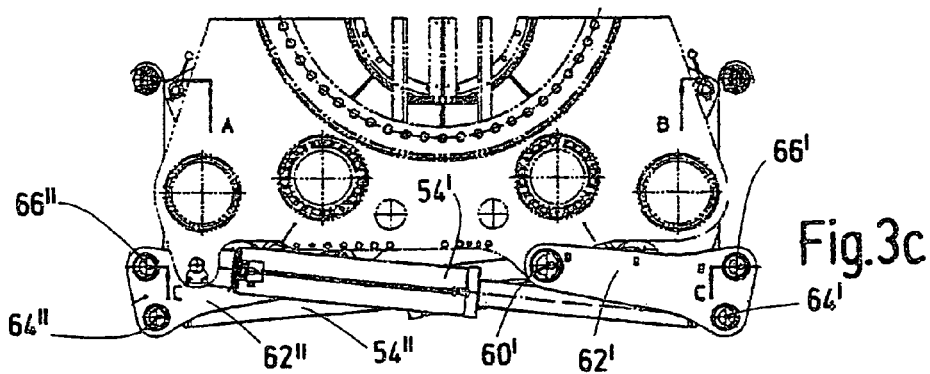
Figure 5A:
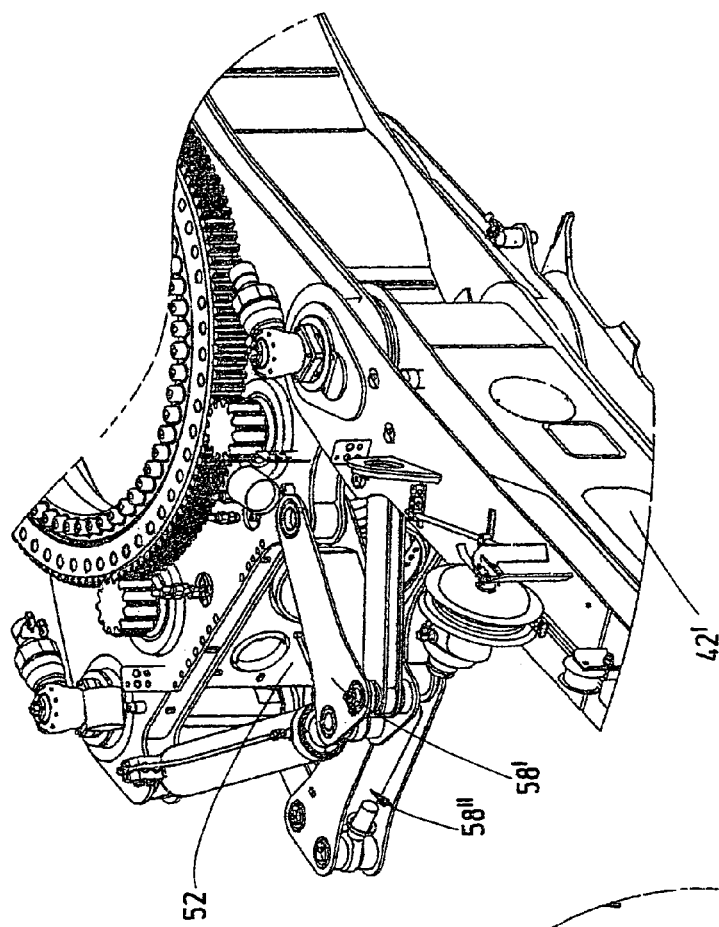
Figure 6A:
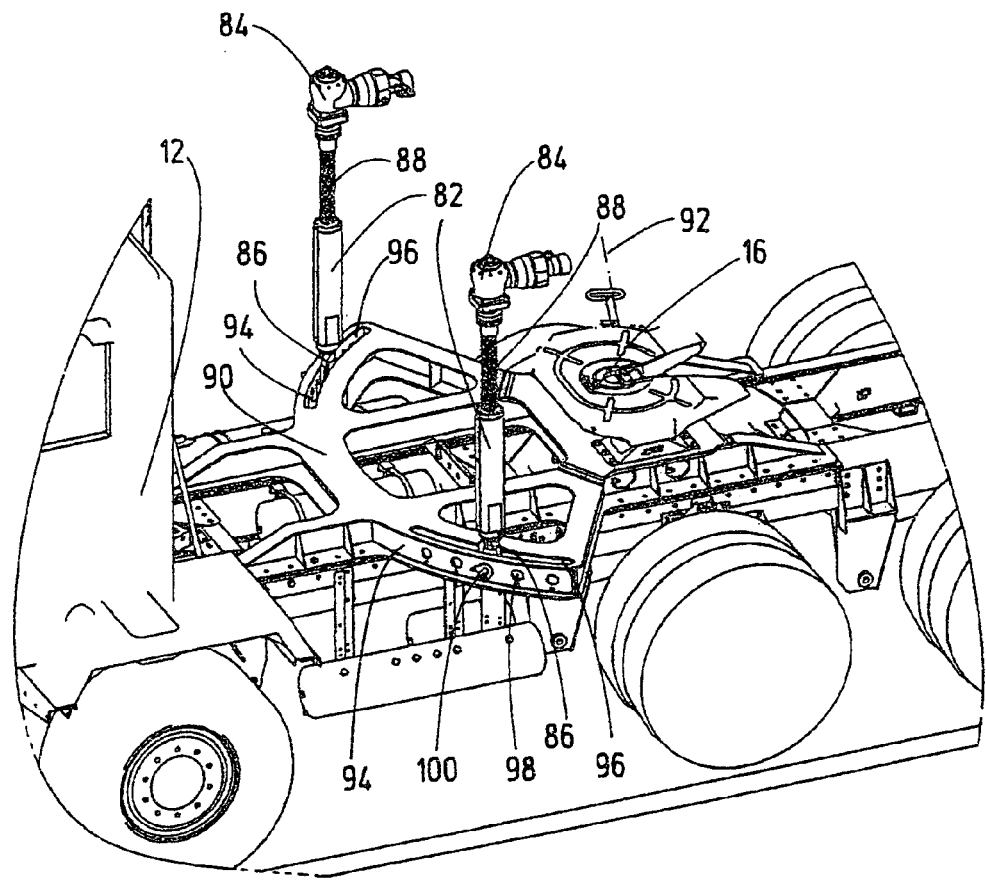
Figure 6B:
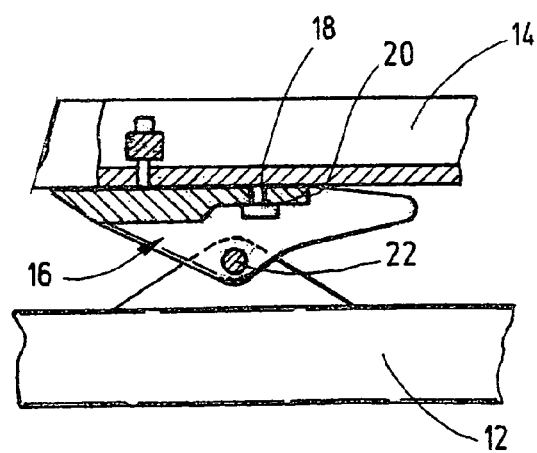

In the following, the invention will be explained in greater detail using an exemplary embodiment shown schematically in the drawing. This shows:

FIG. 1 a diagrammatic representation of a mobile concrete pump in the state of road travel, with support legs pivoted in and distributor mast collapsed;

FIG. 2a a top view of the front part of the mobile concrete pump, with distributor mast removed and front support legs pivoted in;

FIG. 2b a diagrammatic representation of the front part of the mobile concrete pump according to FIG. 1, with front support legs pivoted out;

FIG. 3a to c a diagrammatic representation, a face view, and a top view of the front part of the semi-trailer, with support legs pivoted in;

FIGS. 4a and b a detail of a face front view and a bottom view of the semi-trailer, with a front support leg pivoted out, into the normal position, in a diagrammatic representation, in each instance;

FIGS. 5a and b representations corresponding to FIG. 4a and b, with a front support leg pivoted out, in the narrow support position;

FIG. 6a a detail of a diagrammatic representation of the tractor-trailer with auxiliary frame and lifting mechanism;

FIG. 6b a side view of the fifth-wheel coupling of the tractor-trailer concrete pump, in a representation partly in section;

FIGS. 7a and b a side view and a sectional representation of the lifting mechanism according to FIG. 6a;

FIG. 8 a diagrammatic representation of the auxiliary frame removed from the tractor unit.

The mobile work machine shown in FIG. 1 is configured as a mobile concrete pump, which has a chassis 10 designed as a tractor-trailer, consisting of a five-axle tractor unit 12 and a five-axle semi-trailer 14. The tractor unit 12 is releasably connected with the king pin 18 of the semi-trailer 14, by way of a known fifth-wheel coupling 16 (see FIG. 6b). The latch 20 ensures that both vertical and horizontal transfer of force is possible, by way of the coupling, and that the tractor unit 12 can nevertheless be pivoted about the vertical axis of the king pin 18, relative to the semi-trailer 14. The rotary bearing 22 that is additionally provided on the fifth-wheel coupling 16 allows a nodding movement of the tractor unit 12 about a horizontal transverse axis, relative to the semi-trailer 14.

A distributor mast 30 that is articulated onto a rotating tower 24 and can be rotated, together with the latter, about a vertical axis, by a motor, by means of a gear-wheel transmission 26, and can be unfolded using hydraulic means 28, is disposed on the semi-trailer 14, in the front region; its concrete line 32 can have the liquid concrete to be conveyed applied to it by way of a material application container 34 and a pump unit 36.

A support construction 38 is disposed in the region of the semi-trailer 14, and can be supported on a surface 40, raising the entire tractor-trailer. The support construction 38 has two front support booms 42', 42" and two rear support booms 44, which can be supported on the surface 40 by means of a telescoping support foot 46 that faces downward, on the free end, in each instance. The front support booms 42', 42" can be pivoted on two bearing locations 48', 48" disposed on the tractor-side end of the semi-trailer 14, symmetrical to the longitudinal chassis axis, between a transport position (FIG. 2a) that is parallel to the longitudinal chassis axis, and at least one support position (FIG. 2b), while the rear support booms 44 can be pivoted on bearing locations 50 disposed in the center region of the semi-trailer 14, between a transport position and at least one support position in which they are pivoted out to the side. Extension of the front and rear support booms takes place with hydraulic means, using a hydrocylinder and a suitable deflection gear mechanism, in each instance.

A unique feature of the invention consists in that the activation mechanism of each of the front support booms 42', 42" has a cylinder/piston unit 54', 54" that extends beyond the face part 52 of the semi-trailer 14, configured as a hydrocylinder, which unit is articulated directly onto a bearing eye 56', 56" that is fixed in place on the semi-trailer, at its one end, and onto the related front support boom 42', 42", indirectly by way of a deflection gear mechanism 58', 58", at its other end. As can be particularly seen in FIG. 3a to c, the cylinder/piston units 54', 54" assigned to the two front support booms 42', 42" are disposed in the region of the face part 52 of the semi-trailer 14, facing in opposite directions, one on top of the other, whereby the bearing eyes 56', 56" of the cylinder/piston units 54', 54" assigned to the two front support booms 42', 42", which eyes are fixed in place on the semi-trailer, are disposed in the vicinity of the bearing location 48", 48' of the other front support boom 42", 42', in each instance. The deflection gear mechanism 58', 58" assigned to the activation mechanism of each front support boom 42', 42" has a deflection lever 62', 62" that can be pivoted about an articulation axis that runs parallel to the extension axis in the region of the bearing locations 48', 48" of the related support boom, on an articulation 60', 60" that is fixed in place on the semi-trailer, with its one end, which lever has two articulation locations 64', 66' and 64", 66", respectively, at its other end, in each instance. The second end of the cylinder/piston unit 54', 54" is articulated onto the articulation locations 64', 64", in each instance, while the one end of a rigid extension rod 68', 68" is articulated onto the other articulation location 66', 66", whereby the extension rods 68', 68" are articulated onto an articulation location 70', 70" of the related front support boom 42', 42", situated at a distance from the bearing location 48', 48", with their other end. The articulation locations 64', 66' and 64", 66", respectively, are disposed on the deflection lever 62' or 62", respectively, at a distance from one another, in each instance. The kinematics of the activation mechanisms for the front support booms 42', 42" can best be explained using FIG. 3a to c, 4a and b, as well as 5a and b. In the transport position according to FIG. 3a to c, the front support booms 42', 42" point to the rear, parallel to the longitudinal chassis axis, and lie against the side flanks of the semi-trailer 14 there. In this position, the cylinder/piston units 54', 54" are in their extended end position, so that they enclose their smallest angle with the related deflection lever 62', 62", while the extension rods 68', 68" enclose their greatest angle with the deflection lever 62', 62".

Figure 5B:
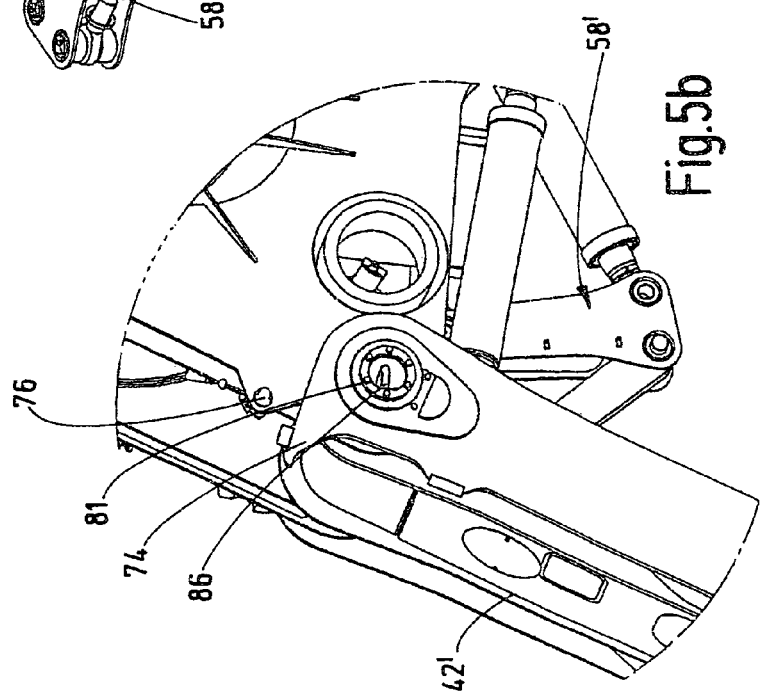

During the course of the extension procedure, the cylinder/piston unit 54' is shortened by retraction of the piston rod. At the same time, the related deflection lever 62' is pivoted forward, into the clear space 72 between the semi-trailer 14 and the tractor unit 12, so that the front support boom 42' is pivoted outward, by way of the extension rod 68'. In the pivot position shown in FIGS. 4a and b, the support boom 42' has reached a first support position, which corresponds to the so-called normal support. In this position, the support boom 42' comes up against a stop 76, which is fixed in place on the chassis, with a contact arm 74. As can be seen in FIGS. 4a and b, the cylinder/piston unit 54' has not yet been completely moved in in this position. Accordingly, an additional support position according to FIGS. 5a and b can be approached, from the position according to FIGS. 4a and b, by means of further shortening of the cylinder/piston unit 54', in which the front support leg 42' is pivoted in close to the tractor unit 12. This is the so-called narrow support, which can be selected for tight set-up locations. In order to reach this support position, first the stop 76 has to be released by hand, so that the contact arm 74 can move past it (see FIG. 5b). In the narrow support, the cylinder/piston unit 54' gets into its moved-in end position, while the deflection lever 62', together with the extension rod 68', are pivoted even further into the clear space 72, and utilize this space almost completely, in terms of its width. Corresponding kinematics result for the support boom 42" and its activation mechanism, as well.

Because of the kinematics of the activation mechanism, a constant feed of pressurized oil to the cylinder/piston unit 54', 54" would lead to a non-uniform angular velocity during pivoting out of the front support legs 42', 42". In order to avoid this, the feed of pressurized oil to the cylinder/piston unit 54', 54" is varied as a function of the angular position of the related front support boom 42', 42" or of the deflection lever 62', 62". This is done, for example, in that a throttle valve 104 is disposed in a pressure agent feed line 102 to the cylinder/piston unit 54', 54", which valve can be controlled by way of a switching organ 106 that responds in a defined angular position of the support boom 42', 42".

In order to guarantee secure support, the front and rear support booms of the support construction 38 are brought into their support position, one after the other, and secured there. This is done using a remote control activated by the operator.

It is practical if the superstructures described above, which relate to the concrete pump and the support construction, are situated on a superstructure frame that is set onto the chassis of the semi-trailer in the partly pre-assembled state, and connected with it.

A unique feature of the mobile work machine that has a tractor-trailer as a chassis 10 consists in that the tractor unit 12 and the semi-trailer 14 can be pivoted, relative to one another, in multiple degrees of freedom, by way of the fifth-wheel coupling 16. Since, on the other hand, the weight of the tractor unit 12 is needed as a ballast weight to stabilize the semi-trailer 14 that is supported on the surface 40 with the support booms 42', 42", 44, in the raised position, particularly in the case of concrete pumps having large distributor masts 30, additional measures are required. These consist, in particular, in that the semi-trailer 14 has special means for raising and holding the tractor unit 12 in place. In order to keep the space required for these means as small as possible, a unique feature of the invention consists in that the bearing locations 48', 48" of the front support booms 42', 42" have an axis-central, continuous cavity 80, and that the means disposed on the semi-trailer 14 for raising and holding the tractor unit 12 in place, each have a lifting element 82 that passes through the central cavity 80 of the bearing location 48', 48", from top to bottom, and can be fixed in place on the tractor unit 12. In this connection, it is practical if the cavity 80 is situated in a bearing pin 81 that is fixed in place on the support boom. The lifting elements 82 are disposed so that they can be raised and lowered relative to the semi-trailer 14, by means of a hydromotor 84, in each instance, and carry a coupling organ 86 at their lower end. The lifting elements 82 in turn are coupled with the related hydromotor 84 by way of a linear drive 88, in each instance, the thread parts of which are configured as a trapezoid thread. As can particularly be seen in FIGS. 7a and b, the coupling organ 86 is configured as an oval ring articulated onto the lower end of the lifting element 82, which ring can be rotated, relative to the lifting element 82, about its longitudinal axis, and can be pivoted about a transverse axis 83.

In order to be able to connect the lifting elements 82, with their coupling organs 86, with the tractor unit 12 in the support position, the tractor unit 12 has an auxiliary frame 90 that has two arc-shaped segments 94, concentric to the vertical axis 92 of the king pin 18, which segments in turn are provided with oblong holes 96 that are correspondingly curved in arc shape and open toward the top, and with locking locations that are disposed at a grid distance from one another and configured as holes 98. Coupling of the lifting elements 82 with the tractor unit 12 takes place in that the coupling organs 86, configured as oval rings, are introduced into the related segment 94 of the auxiliary frame. 90 through one of the oblong holes 96, in each instance, and are fixed in place on the auxiliary frame 90 at one of the locking locations 98, with a socket pin 100. Using these measures, it is possible to couple the tractor unit 12 with the semi-trailer 14 at different angles of rotation about the vertical axis 92. This has proven to be particularly advantageous, because when a tractor-trailer is set up in a support position, the tractor unit 12 will not always be oriented parallel to the semi-trailer 14. In the coupled position, the lifting elements 82 and the fifth-wheel coupling 16 form a connection triangle that ensures that all the wheels of the tractor unit 12 are raised from the surface 40 when the semi-trailer 14 is supported by way of the support construction.

In the travel state, the lifting elements 82 are raised so far, after the socket pins 100 are removed, by way of the hydromotors 84, that the coupling organs 86 are retracted into the cavity 80 (FIG. 7*b*). In this state, the tractor unit 12 and the semi-trailer 14 can be moved, relative to one another, in the degrees of freedom of the fifth-wheel coupling 16.

In summary, the following should be stated: The invention relates to a mobile work machine, particularly a mobile concrete pump, having a chassis 10 designed as a tractor-trailer. The tractor-trailer has a tractor unit 12 and a multi-axle semi-trailer 14 that carries the work machine and is connected with the former by means of a fifth-wheel coupling 16. In the region of the semi-trailer 14, there is a support construction 38 that can be supported on a surface 40, raising the tractor-trailer. The support construction 38 comprises two front support booms 42', 42" and two rear support booms 44, which can be pivoted between a transport position and at least one support position, relative to the semi-trailer, in each instance. Furthermore, means for raising the tractor unit 12 and holding it in place are provided on the semi-trailer 14, so that the tractor unit 12 forms a ballast weight for stabilizing the semi-trailer 14, which is supported on the surface 40 with the support construction 38, in the support position. The invention provides that the activation mechanism of each front support boom 42', 42" has a cylinder/piston unit 54', 54" configured as a hydrocylinder, which extends beyond the face part 52 of the semi-trailer 14, which unit is articulated, at its one end, directly with a bearing eye 56', 56" that is fixed in place on the semi-trailer, and, at its other end, indirectly with the related support boom 42', 42", by way of a deflection gear mechanism 58', 58".

The invention claimed is:

1. Mobile work machine having a chassis (10) that is designed as a tractor-trailer, a multi-axle tractor unit (12) and a multi-axle semi-trailer (14) that carries the work machine and is connected with the tractor unit by means of a fifth-wheel coupling (16), having a support construction (38) that is disposed in the region of the semi-trailer (14) and can be supported on a surface, raising the tractor-trailer, which construction has two front support booms (42', 42") disposed at bearing locations (48', 48") on the tractor unit end of the semi-trailer (14), symmetrical to the longitudinal chassis axis, which can be pivoted between a transport position and at least one support position, by means of a hydraulically driven activation mechanism, in each instance, and two rear support booms (44) that can be pivoted between a transport position and at least one support position, whereby the semi-trailer (14) has means for raising and holding the tractor unit (12) in place, wherein the activation mechanism of each front support boom (42', 42") has a cylinder/piston unit (54', 54") configured as a hydrocylinder, which extends beyond the face part (52) of the semi-trailer (14), which unit is articulated, at its one end, directly with a bearing eye (56', 56") that is fixed in place on the semi-trailer, and, at its other end, indirectly with the related support boom (42', 42"), by way of a deflection gear mechanism (58', 58").

2. Mobile work machine according to claim 1, wherein the cylinder/piston units (54', 54") assigned to the two front support booms (42', 42") are disposed one above the other, on the face (52) of the semi-trailer (14), facing toward opposite sides.

3. Mobile work machine according to claim 1, wherein the bearing eyes (56', 56") of the cylinder/piston units (54', 54") assigned to the two front support booms (42', 42"), which eyes are fixed in place on the semi-trailer, are disposed on the side of the semi-trailer (14) that faces the other front support boom (42", 42'), in each instance.

4. Mobile work machine according to claim 3, wherein the bearing eyes (56', 56") of the cylinder/piston units (54', 54") assigned to the two front support booms (42', 42"), which eyes are fixed in place on the semi-trailer, are disposed in the vicinity of the bearing location (48", 48') of the other front support boom (42", 42'), in each instance.

5. Mobile work machine according to claim 1, wherein the deflection gear mechanism (58', 58") assigned to the activation mechanism of each front support boom (42', 42") has a deflection lever (62', 62") that can be pivoted about an articulation axis parallel to the extension axis of the related support boom (42', 42"), on an articulation (60', 60") that is fixed in place on the semi-trailer, with its one end, which lever has articulation locations (64', 64"; 66', 66") at its other end, on which the cylinder/piston unit (54', 54") as well as the one end of a rigid extension rod (68', 68") are articulated, whereby the extension rod (68', 68") is articulated, with its other end, on an articulation location (70', 70") of the support boom (42', 42") disposed at a distance from the bearing location (48', 48").

6. Mobile work machine according to claim 5, wherein the articulation locations (64', 66'; 64", 66") for the cylinder/piston unit (54', 54") and for the extension rod (68', 68"), which are situated at the other end of the deflection lever (62', 62"), are disposed at a distance from one another.

7. Mobile work machine according to claim 1, wherein all the bearing and articulation axes of the activation mechanism are oriented parallel to the extension axis of the related support boom (42', 42").

8. Mobile work machine according to claim 1, wherein the feed of pressure agent to the cylinder/piston unit (54', 54") can be changed as a function of the angular position of the related front support boom (42', 42") or deflection lever (62', 62").

9. Mobile work machine according to claim 8, wherein a throttle valve (104) is disposed in a pressure agent feed line (102) to the cylinder/piston unit (54', 54"), which valve can be controlled by way of a switching organ (106) that can be switched in a defined angular position of the support boom (42', 42") or of the deflection lever (62', 62").

10. Mobile work machine according to claim 1, wherein the front support booms (42', 42") lie against a releasable stop (76) in a first support position, and against an end stop in a second support position.

11. Mobile work machine according to claim 1, wherein the bearing locations (48', 48") of the front support booms (42', 42") have a continuous, axis-central cavity (80), and wherein the means disposed on the semi-trailer (14) for raising and holding the tractor unit in place each have a lifting element (82) that passes through the central cavity (80) of the bearing locations (48', 48"), from top to bottom, and can be releasably fixed in place on the tractor unit (12).

12. Mobile work machine according to claim 11, wherein the cavity (80) is disposed in a bearing pin (81) that is fixed in place on the support boom.

13. Mobile work machine according to claim 11, wherein the lifting elements (82), which can be raised and lowered by means of a motor (84), in each instance, carry a coupling organ (88) at their lower end, and wherein the tractor unit (12) carries an auxiliary frame (90) on which the coupling organs (86) of the lifting elements (82) can be locked in place.

14. Mobile work machine according to claim 13, wherein the lifting elements (82) are coupled with the related motor (84) by way of a linear drive (88), in each instance.

15. Mobile work machine according to claim 14, wherein the linear drive (88) is configured as a trapezoid thread at its thread parts.

16. Mobile work machine according to claim 13, wherein the fifth-wheel coupling (16) has a king pin (18) disposed in the center, and wherein the auxiliary frame (90) is configured in the shape of an arc, in its outline, and disposed concentric to the axis (92) of the king pin (18), and has multiple locking locations (98) for the coupling organs (86) of the lifting elements (82), disposed at a distance from one another in the circumference direction.

17. Mobile work machine according to claim 16, wherein the coupling organs (86) can be fixed in place at the locking locations (98) by means of socket pins (100).

18. Mobile work machine according to claim 16, wherein the coupling organs (86) are configured as oval rings that can be rotated and pivoted on the lifting element (82) and engage into oblong arc-shaped holes (96) of the auxiliary frame (90), and wherein the locking locations (98) form a hole grid in the auxiliary frame (90), which runs in the circumference direction, on the holes of which the coupling organs (86) can be fixed in place by means of socket pins (100).

19. Mobile work machine according to claim 11, wherein in the transport position, the coupling organs (86) can be retracted into the cavity (80) of the related bearing locations (48', 48"), by means of a motor, by way of the lifting element (82).

20. Mobile work machine according to claim 1, wherein the support booms (42', 42"; 44) that form the support construction (38), and the work machine, are disposed on at least one superstructure frame rigidly connected with the semi-trailer (14).

21. Mobile work machine according to claim 1, wherein the work machine is configured as a concrete pump that has a pump unit (36) disposed on the semi-trailer (14) or on the superstructure frame, having a material application container (34) and a feed line (32) that is connected with the pressure output of the pump unit (36), guided by way of a distributor mast (30).

\* \* \* \* \*